Feb. 8, 1927.

C. G. BROWN 1,617,145

SHUNT

Filed Jan. 6, 1925

Inventor:
Carrol G. Brown
by
His Attorney

Patented Feb. 8, 1927.

1,617,145

UNITED STATES PATENT OFFICE.

CARROL G. BROWN, OF SCHENECTADY, NEW YORK, ASSIGNOR TO GENERAL ELECTRIC COMPANY, A CORPORATION OF NEW YORK.

SHUNT.

Application filed January 6, 1925. Serial No. 900.

My invention relates to a variable ratio electric shunt suitable for use in connection with an electric measuring instrument to determine voltage and current values.

In electrical current measurements, use is often times made of a sensitive galvanometer connected across a shunt so that only a small portion of the current to be measured passes through the galvanometer. In order that the combination may be used over a wide range of current values, the shunt may be provided with a number of contacts so arranged that by changing the contact connections, the ratio of the current flowing through the galvanometer to the total current may be altered. In the variable ratio shunts known to the prior art a change in the shunt ratio changes the resistance of the combination. It is often times desirable to maintain the resistance of the shunt combination constant, for example where a shunt and galvanometer combination is used in the circuit of a thermocouple to measure temperatures or measurements responsive to temperature changes. In such a circuit, in order to take a reading on a given shunt tap and interpret said reading by means of a calibration that was made while using a different tap, requires that the resistance of the circuit be maintained constant. Consequently, it would be very inconvenient to have the resistance of the circuit changed when changing the ratio of the shunt. It is the primary object of my invention to provide a variable ratio shunt which has a constant resistance for all ratios.

The features of my invention which are believed to be novel and patentable will be pointed out in the claims appended hereto. For a better understanding of my invention reference is made in the following description to the accompanying drawing, in which Figs. 1 to 10 inclusive represent shunt combinations which will be referred to in the development of the theory upon which my improved shunt is based, Fig. 11 represents a simplified connection diagram for an 8-point shunt built in accordance with my invention, and Fig. 12 represents a shunt having a different variation factor.

In order to make this explanation as nontechnical as possible, the simplest case is used to start with, and developed on up through to the final form of the shunt. For the sake of simplicity, I will assume a galvanometer resistance of $r$ in the following discussion and drawings, where the galvanometer is indicated by G. Fig. 1 shows a resistance of $10r$ in parallel with the galvanometer. The combined resistance in this case is $$\frac{1}{\frac{1}{r}+\frac{1}{10r}}=\frac{10}{11}r.$$

The total current I flowing in the circuit will divide up between the two branches in inverse proportion to their respective resistances, that is, $Ig$, the galvanometer current, will be $\frac{10}{11}$ of I.

Figure 4:
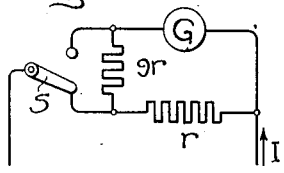

Fig. 4 shows the switch S on the other tap between the two resistance sections. The combined resistance has remained the same, since we still have two branches in parallel of $10r$ and $r$ respectively. In Fig. 4 however, the current ratio of the shunt has been reduced to $\frac{1}{10}$ of its previous value. That is to say, $Ig$ is only $\frac{1}{11}$ of the total current I, or $\frac{1}{10}$ of its previous value.

Figure 5:
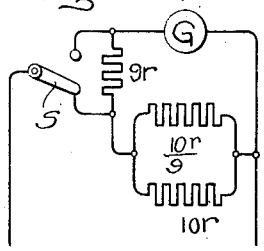

For the $r$ resistance section of Fig. 4, we may substitute two parallel resistances of $\frac{10r}{9}$ and $10r$ respectively, as represented in Fig. 5, since their combined resistance is equal to $$\frac{1}{\frac{9}{10r}+\frac{1}{10r}}=r.$$

Figure 6:
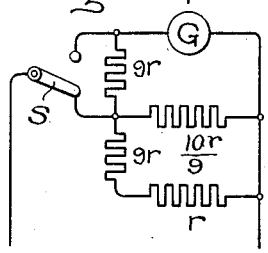

Fig. 6 is identical with Fig. 5 electrically.

Figure 7:
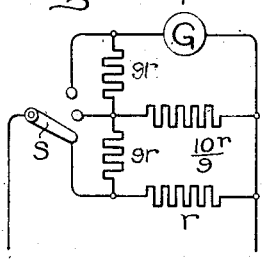
Figure 8:
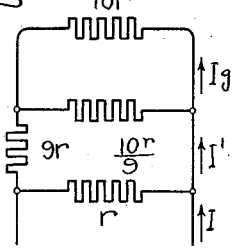
Figure 9:
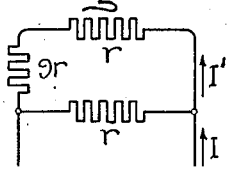
Figure 10:
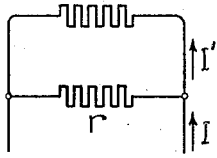

In Fig. 7, another tap is brought out to a third contact button and with switch S on this third contact button, it will be shown that the total resistance remains unchanged and $Ig$ is again reduced by a factor of 10. Let Fig. 7 be simplified as shown in Fig. 8. Current $I'$ divides up between the two branches, one part of the current going through the galvanometer. This latter current $Ig$ is dependent upon the relative resistance of the two branches, and is therefore by simple proportion equal to $\frac{1}{10}$ of $I'$. As shown in connection with Fig. 5, a $10r$ resistance and a $\frac{10}{9}r$ resistance in parallel may be substituted for resistance $r$ without any change in the combined resistance; vice versa, in Fig. 8, we may substitute $r$ for these two parallel branches as represented in Fig. 9, which may be further simplified as in Fig. 10, the proportionate value of $I'$ and $I$ remaining the same.

Figure 1:
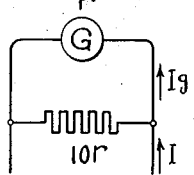
Figure 2:
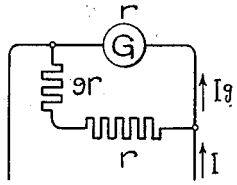
Fig. 2 is equivalent to Fig. 1, except that the shunt resistance is divided into two sections having resistances of $9r$ and $r$ respectively.
Figure 3:
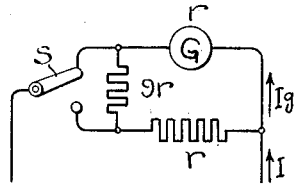
Fig. 3 is the equivalent of Fig. 2, except that a multiple tap switch S is provided whereby the left side of the line may be connected on either side of the $9r$ resistance section and is shown connected to a tap between the galvanometer G and the parallel connected resistance.

Now $I$, or the total current, will divide up inversely proportional to the two branches here represented and therefore $I'$ will be $\frac{1}{11}$ of $I$. Above it was shown that $Ig$ was equal to $\frac{1}{10}$ of $I'$ and therefore $Ig$ will be equal to $\frac{1}{110}$ of $I$ which is $\frac{1}{10}$ of the value of $Ig$ in the case of Fig. 4. Also, in Fig. 10, the total combined resistance is the same as in Fig. 7, Fig. 5 and Fig. 3, or $\frac{10}{11}r$.

It has been shown above for three points, that with the switch at any point, the total combined galvanometer and shunt resistance is the same. It has also been shown that the current ratio is diminished by a factor of 10 for each successive point, since the galvanometer current had successive values of $\frac{10}{11}$, $\frac{1}{11}$ and $\frac{1}{110}$ of the total current. The same line of reasoning may be used for any number of points and the same conditions will hold.

Figure 11:
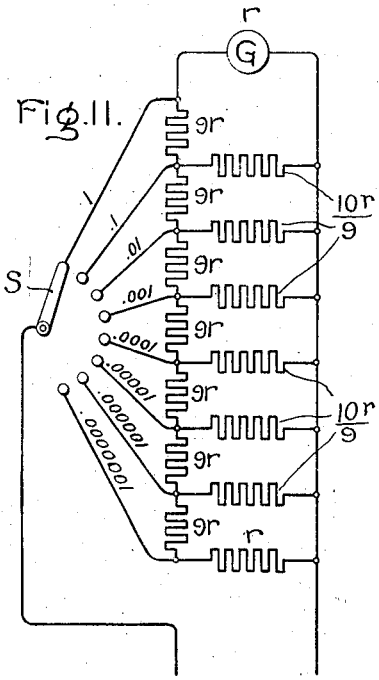

In Fig. 11 I have shown a shunt designed in accordance with my invention having 8 points. By progressively applying the formulæ for parallel connected resistances $$R = \frac{1}{\frac{1}{r} + \frac{1}{r^2} + \frac{1}{r^3} \text{etc.}}$$

it can be shown that the combined resistance of this shunt remains constant for all taps and, by the reasoning used above, that the current flowing through the galvanometer is reduced by a constant factor for each successive tap. In the example given, this factor is $\frac{1}{10}$. The value of $r$ may be made any convenient value near the resistance of the average galvanometer such for example as 100 ohms.

It will be noted that in any one shunt but three values of resistance are used $r$, $9r$ and $\frac{10r}{9}$. Having a number of resistance elements all alike in itself makes for lower cost of building and maintaining such a shunt.

Besides this, all three values of the resistances used are not of widely different values as in multiple point shunts heretofore used. This permits of building a shunt with any number of points desired. Due to the fact that the combined resistance of the circuit remains constant for all taps, a combination of this shunt and a galvanometer may also be used as a voltage measuring device over a wide range of values.

Figure 12:
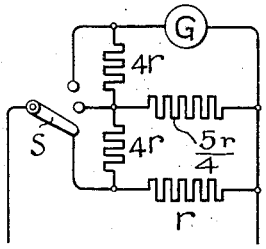

The ratio for various taps need not necessarily be $\frac{1}{10}$; for example in Fig. 12, I have represented a combination having the requisite resistance ratios for constant resistance on all taps where the tap ratio is 5. In this case the combined resistance is in all cases $\frac{5r}{6}$ and the $Ig$ is for the upper tap $\frac{5I}{6}$, for the middle tap $\frac{I}{6}$, and for the lower tap $\frac{I}{30}$.

From the above it will be seen that the improved shunt has certain definite resistance and ratio relations which may be expressed as follows: If we let $r$ equal the resistance of the galvanometer and $x$ the ratio factor between consecutive taps, which factor is 10 in Fig. 11 and 5 in Fig. 12, then we may say that the constant resistance relation will hold when the parallel resistance connected between the highest ratio tap and the opposite side of the line is $r$, the other parallel connected resistances are $$\frac{x}{x-1}r$$

and the resistance between taps are each $(x-1)r$.

In the foregoing I have specified a galvanometer as the device used in combination with the shunt but this device might be any other current consuming device or apparatus of constant resistance in which it is desired to vary the current while maintaining the combined resistance of the circuit constant.

In accordance with the provisions of the Patent Statutes, I have described the principle of operation of my invention, together with the apparatus which I now consider to represent the best embodiment thereof, but I desire to have it understood that the apparatus shown and described in only illustrative and that the invention may be carried out by other means.

What I claim as new and desire to secure by Letters Patent of the United States is:

1. A constant resistance variable ratio shunt and galvanometer combination comprising a galvanometer having a resistance of $r$, a plurality of parallel resistance sections, all connected at one end to one side of said galvanometer, and at the other end to a plurality of taps, said taps being separated from each other by a $(x-1)r$ resistance, a similar resistance connected between one of said taps and the other side of said galvanometer, a tap between said last mentioned resistance and galvanometer, all of the parallel resistance sections except the one most remote from the galvanometer having a resistance value equal to $$\frac{x}{x-1}r$$

and the most remote parallel connected resistance being equal to that of the galvanometer, $x$ being any desired ratio factor.

2. A translating device having a resistance of $r$ and a multiple ratio shunt therefor for varying the ratio of current flowing through said device comprising a plurality of parallel resistance sections having a common connection at one end to one side of said translating device and having taps at the other end, said taps being separated from each other by other resistances each having a value of $(x-1)r$, one of said taps being connected to the other side of said translating device by a resistance of $(x-1)r$, all of the parallel resistance sections except the one most remotely connected with the translating device having resistance values of $$\frac{x}{x-1}r$$

and the other parallel connected resistance section having a resistance equal to $r$, $x$ being any desired ratio factor.

In witness whereof, I have hereunto set my hand this 5th day of January, 1925.

CARROL G. BROWN.